United States Patent
Rubin (10) Patent No.: US 6,811,490 B2
(45) Date of Patent: Nov. 2, 2004

(54) SYSTEM AND METHOD FOR SAVING GAME DATA

(75) Inventor: Jason Pehr Rubin, Pacific Palisades, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

(21) Appl. No.: 10/268,250

(22) Filed: Oct. 9, 2002

(65) Prior Publication Data

US 2003/0114227 A1 Jun. 19, 2003

Related U.S. Application Data

(60) Provisional application No. 60/328,471, filed on Oct. 10, 2001.

(51) Int. Cl.[7] .................................................. A63F 9/24
(52) U.S. Cl. ........................................................ 463/43
(58) Field of Search ........................... 463/1, 37, 43–45, 463/47

(56) References Cited

U.S. PATENT DOCUMENTS

| | | | |
|---|---|---|---|
| 3,623,014 A | | 11/1971 | Doelz et al. |
| 3,668,644 A | * | 6/1972 | Looschen ...................... 714/6 |
| 4,752,068 A | | 6/1988 | Endo |
| 5,273,294 A | * | 12/1993 | Amanai ...................... 463/24 |
| 5,477,492 A | | 12/1995 | Ohsaki et al. |
| 5,971,856 A | | 10/1999 | Aoyama et al. |
| 2002/0142845 A1 | * | 10/2002 | Randall ....................... 463/43 |

* cited by examiner

*Primary Examiner*—Kim Nguyen
(74) *Attorney, Agent, or Firm*—Carr & Ferrell LLP (57) ABSTRACT

A system and method for saving game data. A system automatically or manually saves game data. The system saves two copies of the game data. When a user reaches a point of achievement, the system saves a new copy of game data over one of the previous copies. If the new copy of game data is unsatisfactory, then the system maintains the other previous copy of the game data. If the new copy of the game data is satisfactory, then the system copies the new game data over the previous game data.

33 Claims, 8 Drawing Sheets

SYSTEM AND METHOD FOR SAVING GAME DATA

CROSS-REFERENCE TO RELATED APPLICATION

This application claims priority from U.S. Provisional Patent Application No. 60/328,471, filed on Oct. 10, 2001 and entitled "System and Method for Automatically Saving Game Data," which is incorporated herein by reference in its entirety for all purposes.

BACKGROUND

1. Field of the Invention

The invention relates generally to electronic entertainment systems, and more particularly to a system and method for saving game data.

2. Background of the Invention

In electronic entertainment systems such as gaming systems, a user often interacts with a game program, or electronic game, that is quite complex. Many electronic games require large amounts of time to complete. Often a user does not complete such a game in one sitting, but rather completes the game over several different gaming sessions. In some instances, it may take a user weeks or even months to complete a game.

In order for a user to complete a game over a long period of time, the state of the game should be saved before the end of each gaming session. Instruction manuals often advise users to save the state of the game at various points during game play. In other games, graphical prompts advise users to save the state of the game at various points during play. In some games, a user must manually save the state of the game, and may be prompted to do so at various intervals in the game. These interruptions can be disruptive to a user. Further, a user may forget to save a gaming session at times, thus resulting in the loss of valuable game data.

Moreover, when game or other data is saved the process does not always work perfectly. The game data that is saved might be incomplete, corrupted or the like. This problem might occur, for example, if someone removes a memory card on which the game data is to be saved during the saving process. This problem might occur under other circumstances as well.

SUMMARY OF THE INVENTION

The invention provides in various embodiments a system and method for automatically (or manually) saving game data.

A method according to one embodiment of the invention comprises saving two copies of data representing a state of the game to a storage medium, saving a new copy of data representing a state of the game to the storage medium such that one of the two copies is overwritten, checking the new copy of data to determine whether the new copy of data is satisfactory, saving, if the new copy of data is satisfactory, another new copy of data to the storage medium such that the other of the two copies is overwritten, and maintaining, if the new copy of the data is unsatisfactory, the other of the two copies of data on the storage medium.

A system according to one embodiment of the invention comprises a first module configured to save two copies of data representing a state of the game to a storage medium, a second module configured to save a new copy of data representing a state of the game to the storage medium such that one of the two copies is overwritten, a third module configured to check the new copy of data to determine whether the new copy of data is satisfactory, a fourth module configured to save, if the new copy of data is satisfactory, another new copy of data to the storage medium such that the other of the two copies is overwritten, and a fifth module configured to maintain, if the new copy of the data is unsatisfactory, the other of the two copies of data on the storage medium.

DETAILED DESCRIPTION OF THE INVENTION

Electronic entertainment systems are widely used in today's world. As mentioned herein, in some games a user manually saves the state of the game and may be prompted to do so at various intervals in the game. These interruptions can be very disruptive to a user. Further, a user might neglect to save a gaming session at times, thus resulting in the loss of valuable game data. Accordingly, there is a need for a system that automatically saves game data. The system and methodology described herein solves problems associated with losing game data and disruption of a user. Accordingly, a user can expect his or her system to automatically save critical game data at key points within a game.

Further, when game or other data is saved the process does not always work perfectly. The game data that is saved might be incomplete, corrupted or the like. This problem might occur, for example, if someone removes a memory card on which the game data is to be saved during the saving process. This problem might occur under other circumstances as well. The system and methodology described herein also solves these types of problems.

Figure 1:
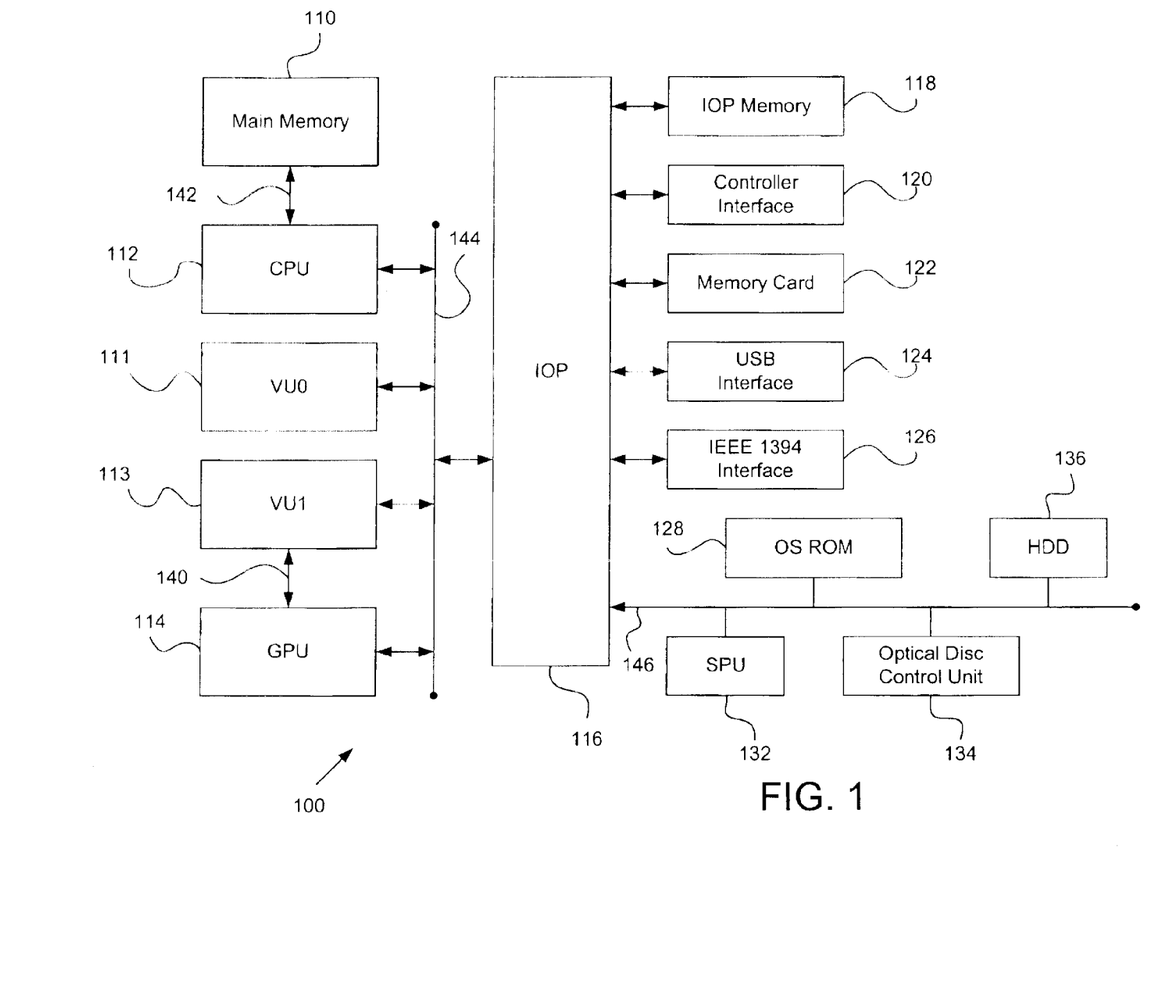
FIG. 1 is a diagram of one embodiment of an electronic entertainment system, in accordance with the invention.

FIG. 1 is a block diagram of one embodiment of an electronic entertainment system 100 in accordance with the invention. System 100 includes, but is not limited to, a main memory 110, a central processing unit (CPU) 112, vector processing units VU0 111 and VU1 113, a graphics processing unit (GPU) 114, an input/output processor (IOP) 116, an IOP memory 118, a controller interface 120, a memory card 122, a universal serial bus (USB) interface 124 and an IEEE 1394 interface 126. System 100 also includes an operating system read-only memory (OS ROM) 128, a sound processing unit (SPU) 132, an optical disc control unit 134 and a hard disc drive (HDD) 136, which are connected via a bus 146 to IOP 116. System 100 is preferably an electronic gaming console; however, system 100 may also be implemented as, for example, a general-purpose computer, a set-top box or a hand-held gaming device.

CPU 112, VU0 111, VU1 113, GPU 114 and IOP 116 communicate via a system bus 144. CPU 112 communicates with main memory 110 via a dedicated bus 142. VU1 113 and GPU 114 may also communicate via a dedicated bus 140. CPU 112 executes programs stored in OS ROM 128 and main memory 110. Main memory 110 may contain pre-stored programs and may also contain programs transferred via IOP 116 from a CD-ROM, DVD-ROM or other optical disc (not shown) using optical disc control unit 134. IOP 116 controls data exchanges between CPU 112, VU0 111, VU1 113, GPU 114 and other devices of system 100 such as controller interface 120.

GPU 114 executes drawing instructions from CPU 112 and VU0 111 to produce images for display on a display device (not shown). VU1 113 transforms objects from three-dimensional coordinates to two-dimensional coordinates and sends the two-dimensional coordinates to GPU 114. SPU 132 executes instructions to produce sound signals that are output on an audio device (not shown).

A user of system 100 provides instructions via controller interface 120 to CPU 112. For example, the user may instruct CPU 112 to store certain game information on memory card 122 or may instruct a character in a game to perform some specified action. Other devices may be connected to system 100 via USB interface 124 and IEEE 1394 interface 126.

Figure 2:
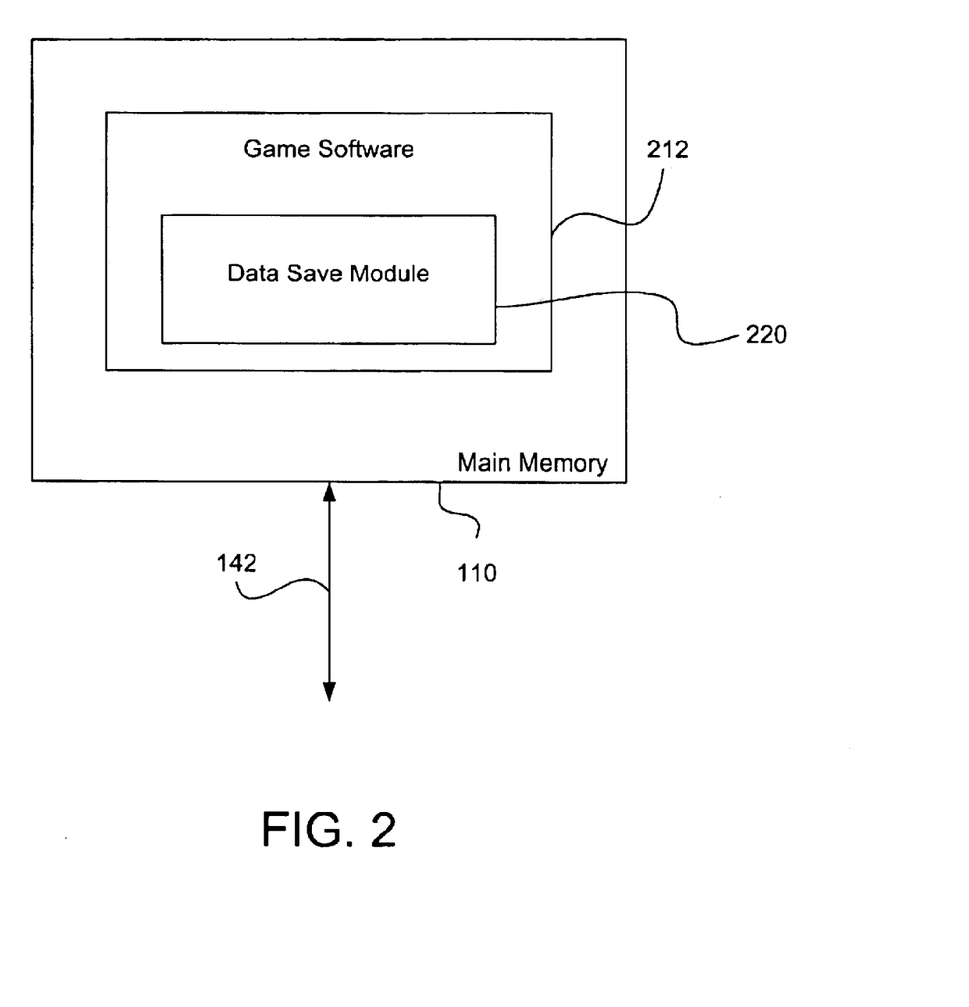
FIG. 2 is a diagram of one embodiment of the main memory of FIG. 1, in accordance with the invention.

FIG. 2 is a block diagram of one embodiment of main memory 110 of FIG. 1, according to the invention. Main memory 110 includes, but is not limited to, game software 212, which was loaded into main memory 110 from an optical disc in optical disc control unit 134. Game software 212 includes instructions executable by CPU 112, VU0 111, VU1 113 and SPU 132 that allow a user of system 100 to play a game. In the FIG. 2 embodiment, game software 212 is a role-playing game (RPG). In other embodiments, game software 212 may be any other type of game, including but not limited to a combat simulation game, a sports game, a racing game, a flight simulation game and a civilization-building simulation game. Game software 212 includes a data save module 220 configured to save game data. In one embodiment, it is contemplated that data save module 220 can be located other than within game software 212.

In one embodiment according to the invention, data save module 220 automatically saves the state of a game onto a storage medium, such as removable memory card 122 or the like. In another embodiment, the state of the game is saved onto a storage medium that is different from the medium that stores game software 212.

In one embodiment according to the invention, data save module 220 initiates an "auto-save" when the user has completed certain tasks, such as entering a new area, solving a puzzle, exiting a maze, etc. In another embodiment, data save module 220 initiates an "auto-save" after a predetermined time interval. Data save module 220 can also allow the user to manually save the state of the game at any time. The functionality of data save module 220 is further discussed below in conjunction with FIGS. 3–6.

Figure 3:
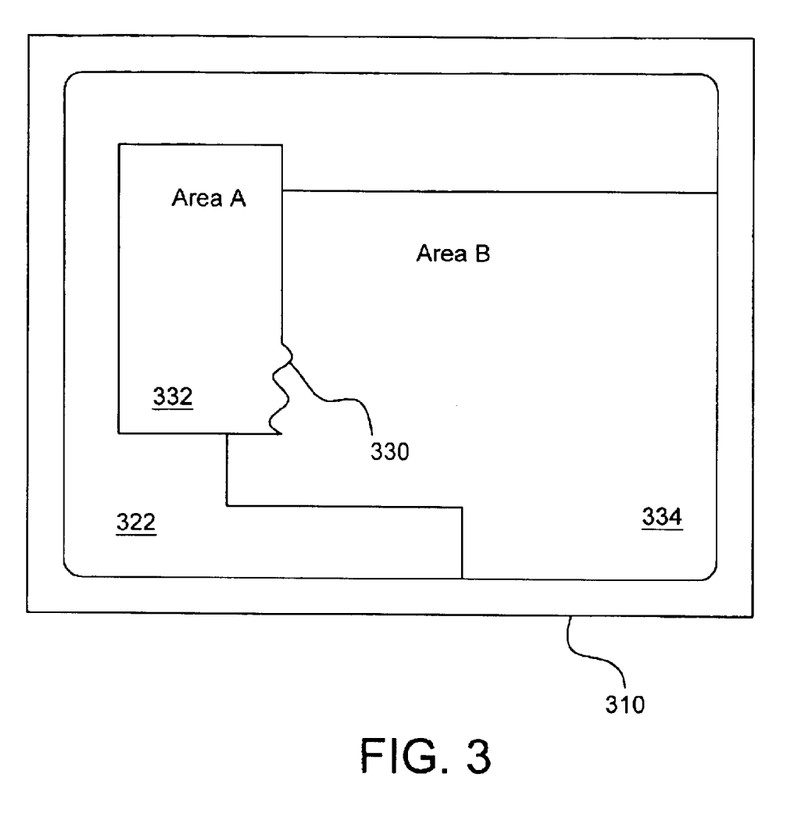
FIG. 3 is a diagram of one embodiment of a game screen on a display device, in accordance with the invention.

FIG. 3 is a diagram of one embodiment of a game screen 322 on a display device 310 connected to system 100, according to the invention. Game screen 322 shows the user's progress in, for example, an RPG.

In the case of an RPG, for example, data save module 220 might automatically save the game at certain points of achievement. For example, the user controls a knight character who explores a dungeon fighting monsters and discovering new areas of the dungeon in order to rescue a princess held hostage deep within. The dungeon has various doors through which the knight cannot pass unless the knight obtains certain keys by defeating monsters of varying strength. In order for the knight to pass from an Area A 332 to an Area B 334 via a door 330, the user must first use the knight to defeat an exceptionally powerful monster in Area A 332. After defeating this monster, the knight can obtain the key needed to open door 330 and enter Area B 334. In one embodiment, the user has reached a point of achievement upon entering Area B 334. In another embodiment, the user has reached a point of achievement upon obtaining the key. In yet another embodiment, the user has reached a point of achievement upon defeating the exceptionally powerful monster. It is contemplated that reaching a point of achievement can include realizing any or all of these three accomplishments, as well as possibly other accomplishments.

Data save module 220 saves game data at points of achievement, either automatically or upon a manual user command. Consequently, if the power goes out, system 100 is manually shut off, the user's character fails or dies, or the like, the user can resume the game from Area B 334 and does not have to repeat killing the monster in Area A 332, as well as possible other actions. It is noteworthy that instead of or in addition to data save module 220 automatically saving the game data, the user can also elect to save the game data manually at certain points of achievement or at various other points. The user can autonomously save game data anytime, autonomously but only at certain times, or only when prompted.

In one embodiment, it may be desirable for data save module 220 not to continuously prompt the user to save the state of the game because the user might consider that to be invasive and disruptive. Data save module 220 allows the user to not have to repeat certain achievements since at the points of achievement data save module 220 (automatically or manually) saves the game. Therefore, for example, if the user's character dies, the character fails, the power is unexpectedly shut off accidentally, the user shuts off the power intentionally and the user neglected to save the game, or the like, the user is able to resume play at the last point of achievement. In the present example, the user would have to start at the beginning of Area B 334. It is also contemplated that instead of having to start at the beginning of the last area, the user might start anywhere in the last area. For example, the user might start over in a randomly selected part of Area B 334.

Consequently, if the user is in a situation where the knight dies, the user might feel as though the user has simply expired a life but not lost any significant achievement. When the user loads the saved game the user will resume play from the last point of achievement (e.g., Area B 334). After resuming play, the user can decide to instruct the knight to do different things and/or go to different places in Area B 334 than the user instructed before. The user can also instruct the knight to travel to a different area.

In one embodiment, when the user resumes play some or all of the knight's possessions, attributes or the like are saved intact as part of the last point of achievement. In an alternate embodiment, the knight's possessions, attributes, etc., are not saved intact as part of the last point of achievement.

In keeping with aspects of the invention, when attempting to save to a storage medium such as memory card 122 there is a chance that something will happen that causes the saved data to be unsatisfactory (e.g., to be incomplete or corrupted). The data may not be saved at all for some reason, and might therefore also be considered to be unsatisfactory. For example, the user (or someone else) removes the storage medium during the saving process or there is a power surge during the saving process.

Figure 4:
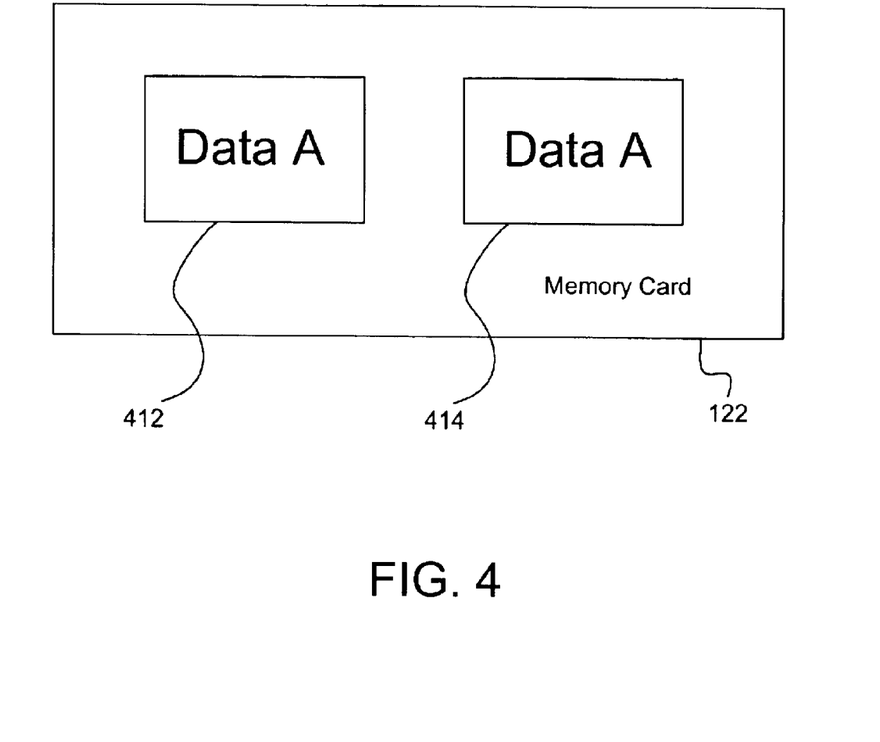
FIG. 4 is a diagram of one embodiment of the memory card of FIG. 1, in accordance with the invention.

FIG. 4 is a diagram of one embodiment of memory card 122 of FIG. 1, in accordance with the invention. Memory card 122 includes but is not limited to a data area 412 and a data area 414 for storing game data. It is contemplated that memory card 122 can be implemented as any type of non-volatile memory (e.g., a disc, magnetic device or the like).

As shown in FIG. 4, one embodiment of data save module 220 saves two copies of game data (data A) onto memory card 122. Data save module 220 saves data A in both data area 412 and data area 414. Data save module 220 saves the two copies of game data, for example, when the user reaches a point of achievement.

Figure 5:
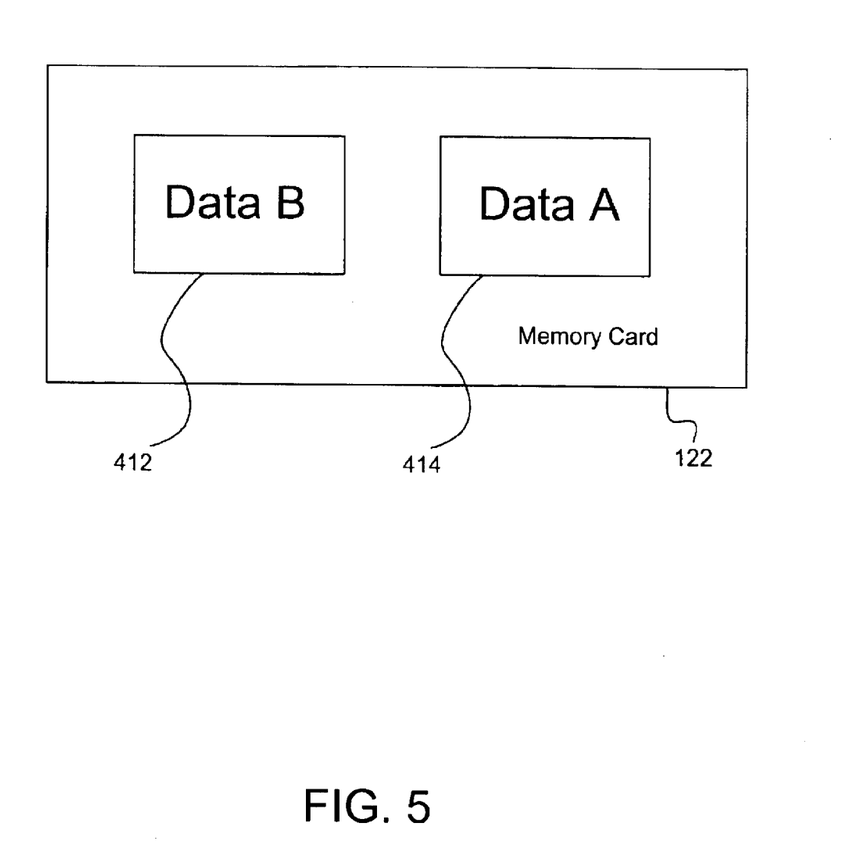
FIG. 5 is a diagram illustrating a new copy of game data being written over one of the two previous copies of game data in the memory card of FIG. 4, in accordance with one embodiment of the invention.

FIG. 5 is a diagram illustrating a new copy of game data (data B) being written over one of the two previous copies of game data (data A) in data area 412 of memory card 122, in accordance with one embodiment of the invention. This occurs during a next save (auto-save or manual save) when data B (the new data) is written over the copy of data A (the initial or previous data) in data area 412. Data save module 220 then checks data B (the new data) to determine if data B is satisfactory. In one embodiment, data save module 220 checks data B by determining if the entire amount of data A in data area 412 was overwritten. However, any suitable method of checking data B is within the scope of the invention.

Figure 6:
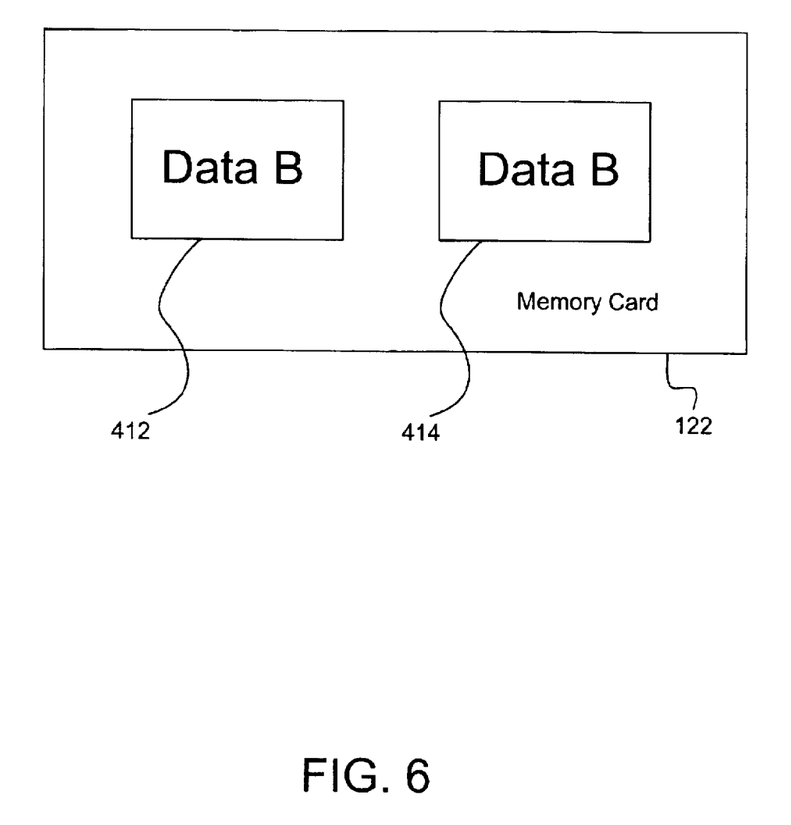
FIG. 6 is a diagram illustrating the new copy of game data being written over the other of the two previous copies of game data in the memory card of FIG. 4, in accordance with one embodiment of the invention.

FIG. 6 is a diagram illustrating the new copy of game data (data B) being written over the other of the two previous copies of game data (data A) in data area 414 of memory card 122, in accordance with one embodiment of the invention. This occurs when the copy of the new data (data B) in data area 412 was checked and found to be satisfactory. At that point, the new data (data B) is written over the other copy of the previous data (data A) in data area 414 so that memory card 122 again contains two copies of the game data. The new copy of game data (data B) written over the previous game data (data A) in data area 414 may be from main memory 110 or from data area 412 of memory card 122.

However, if the new game data (data B) is found to be unsatisfactory during the check, then the new game data (data B) is not written over the other copy of the previous game data (data A) in data area 414 and the other copy of the previous game data (data A) is maintained. Thus, the user is not required to start over from the beginning of the game if one auto-save (or manual save) resulted in unsatisfactory data.

Figure 7:
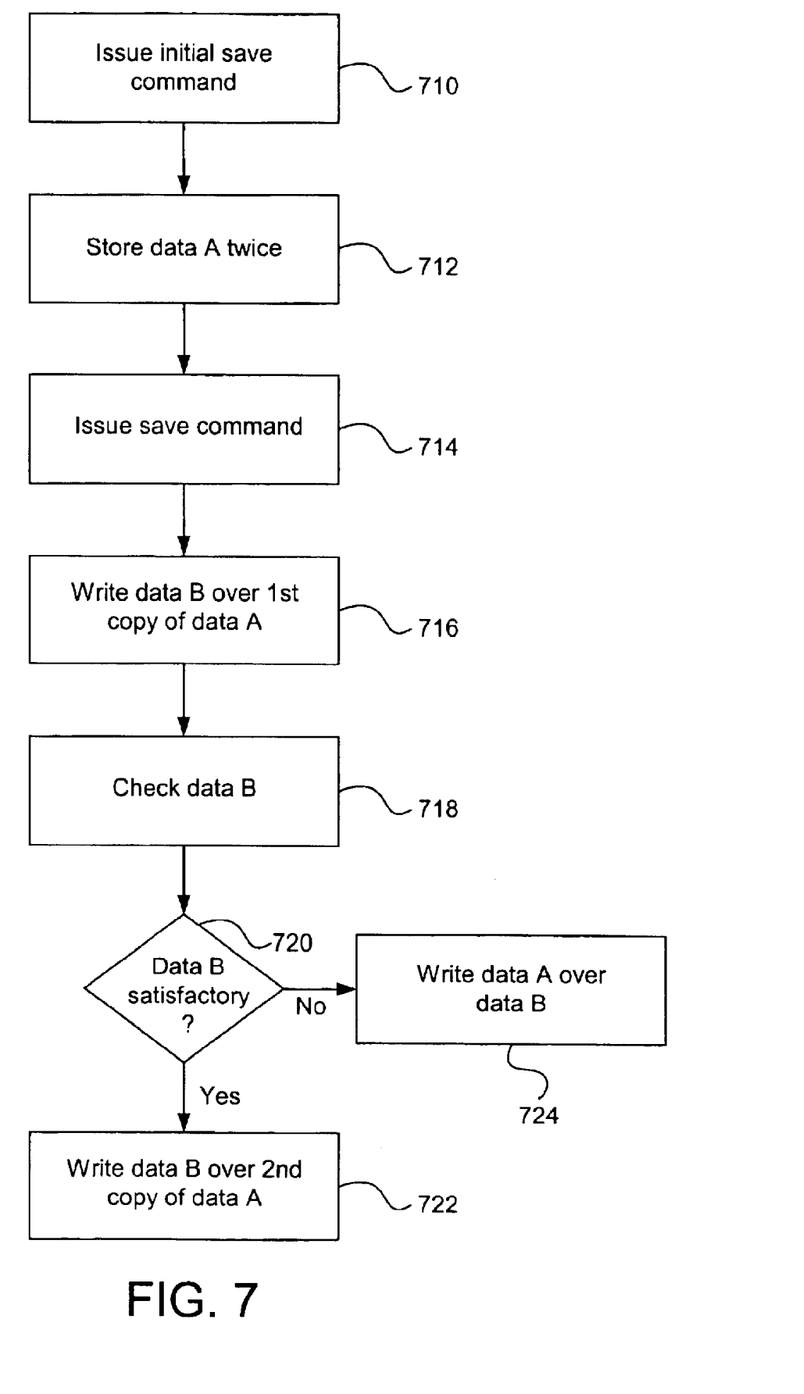
FIG. 7 is a flowchart of method steps for saving game data, in accordance with one embodiment of the invention.

FIG. 7 is a flowchart of method steps for saving game data, in accordance with one embodiment of the invention. In step 710, data save module 220 issues an initial save command. One example of data save module 220 issuing a save command is an automatic issuance when the user reaches a point of achievement. Alternatively, data save module 220 may issue a save command in response to input from the user. Another example of data save module 220 issuing a save command is automatically on a periodic basis.

In step 712, data save module 220 saves data A (game data) in both data area 412 and data area 414. Data save module 220 saves the game data, for example, onto a removable storage medium such as memory card 122. However, it is contemplated that data save module 220 can save the data in any suitable location.

In step 714, data save module 220 issues a save command either automatically or in response to the manual input of a user. This might happen, for example, when a user reaches a point of achievement. In step 716, data save module 220 writes data B (the new data) over data A (the previous data) in data area 412.

In step 718, data save module 220 checks data B (the new data) to determine whether data B is satisfactory (e.g., complete and uncorrupted or the like). In step 720, data save module 220 makes a determination as to whether or not data B (the new data) is satisfactory. If the new data is satisfactory then the method proceeds to 722. If the new data is unsatisfactory then the method proceeds to step 724.

In step 722, if data save module 220 determined in step 720 that data B (the new data) was satisfactory, then data save module 220 writes data B (the new data) over data A in data area 414 and game play can continue.

In step 724, if data save module 220 determined in step 720 that data B (the new data) was unsatisfactory, then data save module 220 writes data A (the previous data) from data area 414 over data B (the new data) in data area 412. Another save can be attempted at this point. Alternatively, upon shutdown of system 100 the user can resume play at the last point of achievement using data A.

Figure 8:
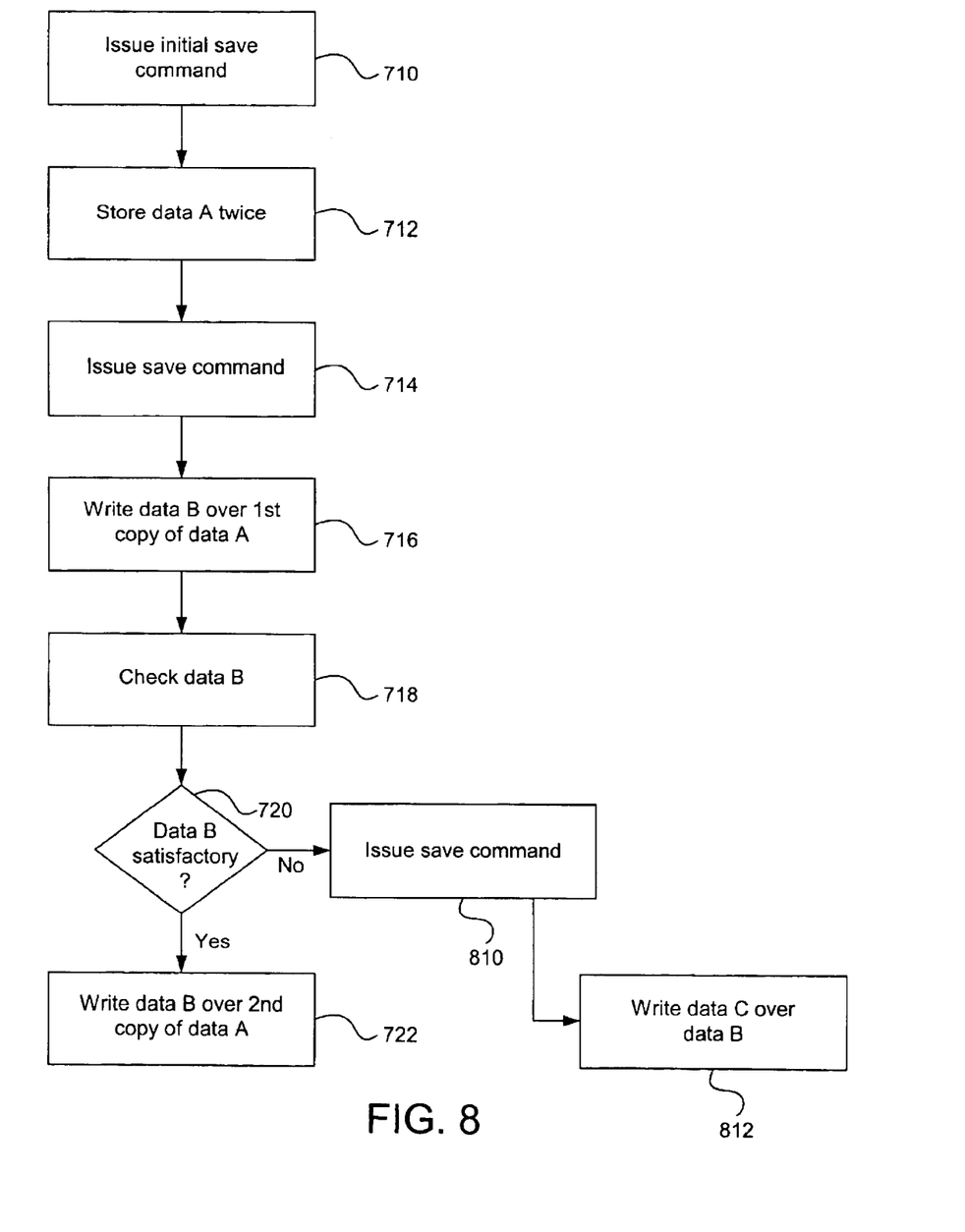
FIG. 8 is a flowchart of method steps for saving game data, in accordance with another embodiment of the invention.

FIG. 8 is a flowchart of method steps for saving game data, in accordance with another embodiment of the invention. Steps 710 through 722 of FIG. 8 are the same as steps 710 through 722 of FIG. 7.

However, in the embodiment of FIG. 8, the method proceeds to step 810 if in step 720 data save module 220 determined that data B (the new data) was unsatisfactory. In step 810, data save module 220 issues a save command either automatically or in response to the manual input of a user. In step 812, data save module 220 writes data C (the most current game data) over the copy of game data that was found to be unsatisfactory in step 720. In this example, data save module 220 thus writes data C (the most current game data) over data B in data area 412. Data save module 220 then checks data C to determine if data C is satisfactory.

Thus, a system and methodology have been described for improving the manner in which game data is saved. It is contemplated that the system and method of the invention are not limited to game data, but can be used in conjunction with any suitable type of data.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of saving game data of a game, the method comprising:

saving a first and a second copy of data representing a first state of the game to a storage medium;

saving a first new copy of data representing a second state of the game to the storage medium such that the first copy is overwritten;

checking the first new copy of data to determine whether the first new copy of data is satisfactory;

if the first new copy of data is satisfactory, saving a second new copy of data to the storage medium such that the second copy is overwritten; and if the first new copy of data is unsatisfactory, maintaining the second copy of data on the storage medium.

2. The method of claim 1, wherein the storage medium is a removable storage medium that does not store game instructions.

3. The method of claim 1, wherein the step of saving a first and a second copy of data representing a first state of the game is performed by a data save module without input from a user, and the step of saving a first new copy of data representing a second state of the game is performed by a the data save module without input from the user.

4. The method of claim 1, wherein each of the steps of claim 1 is performed automatically.

5. The method of claim 1, wherein each of the steps of claim 1 is performed automatically at a point of achievement in the game.

6. The method of claim 1, wherein each of the steps of claim 1 is performed automatically on a periodic basis.

7. The method of claim 1, wherein a user of the game manually initiates at least the step of saving a first and a second copy of data.

8. A system for saving game data of a game, the system comprising:

a first module configured to save a first and a second copy of data representing a first state of the game to a storage medium;

a second module configured to save a first new copy of data representing a second state of the game to the storage medium such that the first copy is overwritten;

a third module configured to check the first new copy of data to determine whether the first new copy of data is satisfactory;

a fourth module configured to save, if the first new copy of data is satisfactory, a second new copy of data to the storage medium such that the two second copy is overwritten; and a fifth module configured to maintain, if the first new copy of data is unsatisfactory, the two second copy of data on the storage medium.

9. The system of claim 8, wherein a data save module comprises the first through fifth modules.

10. The system of claim 8, wherein the first through fifth modules are the same module.

11. The system of claim 8, wherein the storage medium is a removable storage medium that does not store game instructions.

12. The system of claim 8, wherein the first module is included in a data save module configured to save the first and the second copy of data representing the first state of the game without input from a user, and the second module is included in the data save module configured to save the first new copy of data representing the second state of the game without input from the user.

13. The system of claim 8, wherein the first module, second module and fourth module are configured to.automatically save data.

14. The system of claim 8, wherein the first module, second module and fourth module are configured to automatically save data at a point of achievement in the game.

15. The system of claim 8, wherein the first module, second module and fourth module are configured to automatically save data on a periodic basis.

16. The system of claim 8, wherein a user of the game manually initiates operation of at least the first module.

17. A system for saving game data of a game, the system comprising:

first means for saving a first and a second copy of data representing a first state of the game to a storage medium;

second means for saving a first new copy of data representing a second state of the game to the storage medium such that the first copy is overwritten;

third means for checking the first new copy of data to determine whether the first new copy of data is satisfactory;

if the first new copy of data is satisfactory, fourth means for saving a second new copy of data to the storage medium such that the second copy is overwritten; and if the first new copy of data is unsatisfactory, fifth means for maintaining the second copy of data on the storage medium.

18. The system of claim 17, wherein a data save means includes the first through fifth means.

19. The system of claim 17, wherein the first through fifth means are the same means.

20. The system of claim 17, wherein the storage medium is a removable storage medium that does not store game instructions.

21. The system of claim 17, wherein the first means is a data save means configured to save the first and the second copy of data representing the first state of the game without input from a user, and the second means is the data save means configured to save the first new copy of data representing the second state of the game without input from the user.

22. The system of claim 17, wherein the first means, second means and fourth means are configured to automatically save data.

23. The system of claim 17, wherein the first means, second means and fourth means are configured to automatically save data at a point of achievement in the game.

24. The system of claim 17, wherein the first means, second means and fourth means are configured to automatically save data on a periodic basis.

25. The system of claim 17, wherein a user of the game manually initiates operation of at least the first means.

26. A computer-readable medium, comprising:

first instructions for saving a first and a second copy of data representing a first state of a game to a storage medium;

second instructions for saving a first new copy of data representing a second state of the game to the storage medium such that the first copy is overwritten;

third instructions for checking the first new copy of data to determine whether the first new copy of data is satisfactory;

if the first new copy of data is satisfactory, fourth instructions for saving second new copy of data to the storage medium such that the second copy is overwritten; and if the first new copy of the data is unsatisfactory, fifth instructions for maintaining the second copy of data on the storage medium.

27. The computer-readable medium of claim 26, wherein the storage medium is a removable storage medium that does not store game instructions.

28. The computer-readable medium of claim 26, wherein the first instructions for saving are included in a data save module configured to save the first and the second copy of data representing the first state of the game without input from a user, and the second instructions for saving are included in the data save module configured to save the first new copy of data representing the second state of the game without input from the user.

29. The computer-readable medium of claim 26, wherein the first instructions for saving, second instructions for saving and fourth instructions for saving are configured to automatically save data.

30. The computer-readable medium of claim 26, wherein the first instructions for saving, second instructions for saving and fourth instructions for saving are configured to automatically save data at a designated achievement point in the game.

31. The computer-readable medium of claim 26, wherein the first instructions for saving, second instructions for saving and fourth instructions for saving are configured to automatically save data on a periodic basis.

32. The computer-readable medium of claim 26, wherein a user of the game manually initiates execution of at least the first instructions.

33. The computer-readable medium of claim 26, wherein a user of the game manually initiates execution of the second instructions.

* * * * *